US009408242B2

(12) United States Patent
Kadambi et al.

(10) Patent No.: US 9,408,242 B2
(45) Date of Patent: Aug. 2, 2016

(54) AD HOC NETWORK (75) Inventors: Govind Rangaswamy Kadambi, Bangalore (IN); Rinki Sharma, Mysore (IN); Shiva Kumar Ponnuraj, Bangalore (IN)

(73) Assignee: M. S. RAMAIAH SCHOOL OF ADVANCED STUDIES (IN)

( * ) Notice: Subject to any disclaimer, the term of this patent is extended or adjusted under 35 U.S.C. 154(b) by 474 days.

(21) Appl. No.: 13/266,128

(22) PCT Filed: Feb. 24, 2011

(86) PCT No.: PCT/IB2011/050772
§ 371 (c)(1),
(2), (4) Date: Oct. 25, 2011

(87) PCT Pub. No.: WO2012/093294
PCT Pub. Date: Jul. 12, 2012

(65) Prior Publication Data
US 2012/0176937 A1    Jul. 12, 2012

(51) Int. Cl.
*H04H 20/71* (2008.01)
*H04W 76/02* (2009.01)
*H04W 8/00* (2009.01)
*H04W 84/18* (2009.01)
*H04W 48/16* (2009.01)

(52) U.S. Cl.
CPC .......... *H04W 76/023* (2013.01); *H04W 76/025* (2013.01); *H04W 8/005* (2013.01); *H04W 48/16* (2013.01); *H04W 84/18* (2013.01)

(58) Field of Classification Search
USPC ......... 370/229, 254, 255, 312, 313, 329, 331, 370/431, 432, 433, 437, 450, 459; 455/450, 455/552.1
See application file for complete search history.

(56) References Cited

U.S. PATENT DOCUMENTS

| 6,028,853 | A | 2/2000 | Haartsen |
| 8,885,572 | B2 | 11/2014 | Laroia et al. |
| 2004/0162115 | A1 | 8/2004 | Smith et al. |
| 2005/0153732 | A1* | 7/2005 | Stotelmyer et al. ........ 455/552.1 |
| 2006/0084444 | A1* | 4/2006 | Kossi et al. .................. 455/450 |

(Continued)

FOREIGN PATENT DOCUMENTS

| CN | 1738292 A | 2/2006 |
| CN | 101040470 A | 9/2007 |

(Continued)

OTHER PUBLICATIONS

Romit Roy Choudhury et al., "Deafness: A MAC Problem in Ad Hoc Networks when using Directional Antennas," In Proceedings of the 12th IEEE International Conference on Network Protocols (ICNP '04), Oct. 2004, pp. 283-292, Berlin, Germany.

(Continued)

*Primary Examiner* — Yemane Mesfin
*Assistant Examiner* — Mon Cheri Davenport
(74) *Attorney, Agent, or Firm* — Ren-Sheng International (57) ABSTRACT The present disclosure set forth a method for a node to participate in an ad hoc network. The first node receives a first link information broadcasted omnidirectionally by a second node. The first link information indicates if the second node is communicating via a first directional link in a first polarization with a third node. The first node establishes a second directional link in a second polarization with the second node.

18 Claims, 7 Drawing Sheets

(56) References Cited

U.S. PATENT DOCUMENTS

| | | | |
|---|---|---|---|
| 2008/0267259 A1 | 10/2008 | Budampati et al. | |
| 2012/0182932 A1* | 7/2012 | Amis et al. | 370/315 |
| 2013/0243110 A1* | 9/2013 | Skov et al. | 375/267 |

FOREIGN PATENT DOCUMENTS

| | | | |
|---|---|---|---|
| CN | 101242431 A | 8/2008 | |
| CN | 101690297 A | 3/2010 | |
| JP | 2006521751 A | 9/2006 | |
| JP | 2006279951 A | 10/2006 | |
| JP | 2009253473 A | 10/2009 | |
| JP | 2009253704 A | 10/2009 | |
| JP | 2010141853 A | 6/2010 | |
| JP | 2014502124 A | 1/2014 | |
| KR | 20000005185 A | 1/2000 | |
| KR | 1020080092439 A | 10/2008 | |
| WO | 2007091219 A1 | 8/2007 | |

OTHER PUBLICATIONS

Katsushiro Nagashima et al., "Evaluations of a Directional MAC Protocol for Ad Hoc Networks," Proceedings IEEE International Conference on Distributed Computing Systems, Mar. 2004.

Nader S. Fahmy et al., "Ad Hoc Networks with Smart Antennas Using IEEE 802.11-Based Protocols," Proceedings IEEE International Conference on Communications, Apr. 2002, pp. 3144-3148.

T. Ueda et al., "Location-Aware Power-Efficient Directional MAC in Ad Hoc Networks using Directional Antenna," IEICE Trans. Communication, Mar. 2005, pp. 1169-1181, vol. E88-B, No. 3.

Thanasis Korakis et al., "A MAC protocol for full exploitation of Directional Antennas in Ad-hoc Wireless Networks," Proceedings ACM MobiHoc, Jun. 2003, pp. 98-107.

Gentian Jakllari et al., "Handling Asymmetry in Gain in Directional Antenna Equipped Ad Hoc Networks," Proceedings IEEE International Symposium on Personal Indoor and Mobile Radio Communications, Sep. 2005.

Hrishikesh Gossain et al., "MDA: An Efficient Directional MAC scheme for Wireless Ad Hoc Networks," Proceedings IEEE Global Communications Conference, Nov. 2005.

Hrishikesh Gossain et al., "The Deafness Problems and Solutions in Wireless Ad Hoc Networks using Directional Antennas," Proceedings IEEE Global Communications Conference, Nov. 2004.

Jianfeng Wang et al., "SYN-DMAC: A Directional MAC Protocol for Ad Hoc Networks with Synchronization," Proceedings IEEE Military Communications Conference, Oct. 2005.

Masanori Takata et al., "Performance Analysis of a Directional MAC Protocol for Location Information Staleness in MNANETs," IPSJ Journal, Nov. 2005, pp. 2623-2632, vol. 46, No. 11.

Yihu Li et al., "On Wireless Ad Hoc Networks with Directional Antennas: Efficient Collision and Deafness Avoidance Mechanisms," EURASIP Journal on Wireless Communication and Networking, pp. 1-14, vol. 2008.

Notification of Transmittal of the International Search Report and the Written Opinion of the International Searching Authority, May 31, 2011.

Kenichi Mase et al., "AdHoc Networks and Mesh Networks", Corona Publishing Co., Ltd., Sep. 20, 2007, pp. 170-171, vol. 1.

Yihu Li et al., "Efficient Deafness Avoidance in Wireless Ad Hoc and Sensor Networks with Directional Antennas," Proceedings of the 2nd ACM international workshop on Performance evaluation of wireless ad hoc, sensor, and ubiquitous networks, Oct. 10-13, 2005, pp. 175-180, Montreal, Quebec, Canada.

\* cited by examiner

AD HOC NETWORK

CROSS-REFERENCE TO RELATED APPLICATIONS

The present application is a U.S. National stage filling under 35 U.S.C. §371 application of International Application PCT/IB2011/050772, filed Feb. 24, 2011 and entitled "AD HOC NETWORK." The International Application claims priority to Indian Patent Application 60/CHE/2011, filed on Jan. 7, 2011. The Indian Patent Application and the International Application, including any appendices or attachments thereof, are incorporated by reference herein in their entireties.

TECHNICAL FIELD

The present disclosure relates generally to networking technologies and more specifically to an ad hoc network.

BACKGROUND

An ad hoc network is a self-configuring network of mobile nodes connected by links. A node in the network may be free to move independently in any direction, and may change its link to other nodes frequently. When a first node tries to establish a link with a second node, the first node may transmit a first message to the second node. In response to the first message, the second node may transmit a second message back to the first node to confirm receipt of the first message. A link may be established after the first node receives the second message.

The second node, however, may not be able to respond the first message when the second node is already exchanging information with a third node in the network. The failure of not responding the first message may result in inefficiencies of the network.

SUMMARY

One embodiment of the present disclosure may generally relate to a method for a first node to participate in an ad hoc network that includes the first node and at least second and third nodes. The method includes receiving a first link information broadcasted omnidirectionally by the second node, the first link information indicating if the second node is communicating via a first directional link in a first polarization with the third node, and establishing a second directional link in a second polarization with the second node.

Another embodiment of the present disclosure may generally relate to a method for a first node to participate in an ad hoc network that includes the first node and at least a second node. The method includes the first node broadcasting omnidirectionally a first link information, the link information indicating the first node is communicating via a first directional link in a first polarization with another node, and the first node establishing the first directional link in the first polarization with the second node. The method further includes after receiving a data via the first directional link in the first polarization from the second node and prior to sending an acknowledgment via the first directional link in the first polarization to the second node, the first node broadcasting omnidirectionally an updated first link information, the updated link information indicating the first node is communicating via the first directional link in the first polarization with the second node, and after broadcasting omnidirectionally the updated first link information, the first node sending the acknowledgement via the first directional link in the first polarization to the second node.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

This disclosure is drawn, inter alia, to methods, apparatus, computer programs, and systems related to an ad hoc network.

An ad hoc network may include multiple nodes. The nodes in the network are configured to exchange information with each other. The information may be carried by electromagnetic waves.

In some embodiments, each node in the ad hoc network may be configured to broadcast information about its links with other nodes ("link information"). In some embodiments, each node may be configured to establish a link to another node in one of two orthogonal polarizations. In some embodiments, broadcasts are omnidirectional in one polarization, and links between nodes are directional in either polarization.

For example, periodically a first node omnidirectionally broadcasts its link information before it establishes a directional link with another node. The link information indicates the first node is idle and a desired polarization for a directional link with the first node. After the first node establishes a directional link with a second node, such as by exchanging request-to-send (RTS) and clear-to-send (CTS) frames, the first node omnidirectionally broadcasts its link information prior to sending a data (DATA) frame to the second node. The link information now indicates the first and the second nodes have established a directional link and a polarization of the directional link. The second node also omnidirectionally broadcasts its own link information prior to sending an acknowledgement (ACK) frame to the first node in response to the data frame. Note that RTS, CTS, DATA, and ACK frames conform to media access control (MAC) mechanism of the Institute of Electrical and Electronics Engineers (IEEE) 802.11 protocols.

When a third node receives either of the latter broadcasts, the third node learns that the first and the second nodes are communicating and will not disturb their directional link. In some embodiments, the link information further includes network allocation vector (NAV) information that tells the third node the duration for which the first and the second nodes may be busy. Should the third node wish to communicate with the first node, the third node may wait for the communication between the first and the second nodes to complete or it may initiate a directional link with the first node using another polarization. Should the third node wish to communicate with a fourth node close to the first node or the second node, it may initiate a directional link with the fourth node using the other polarization without disturbing the directional link between the first and the second nodes.

Figure 1:
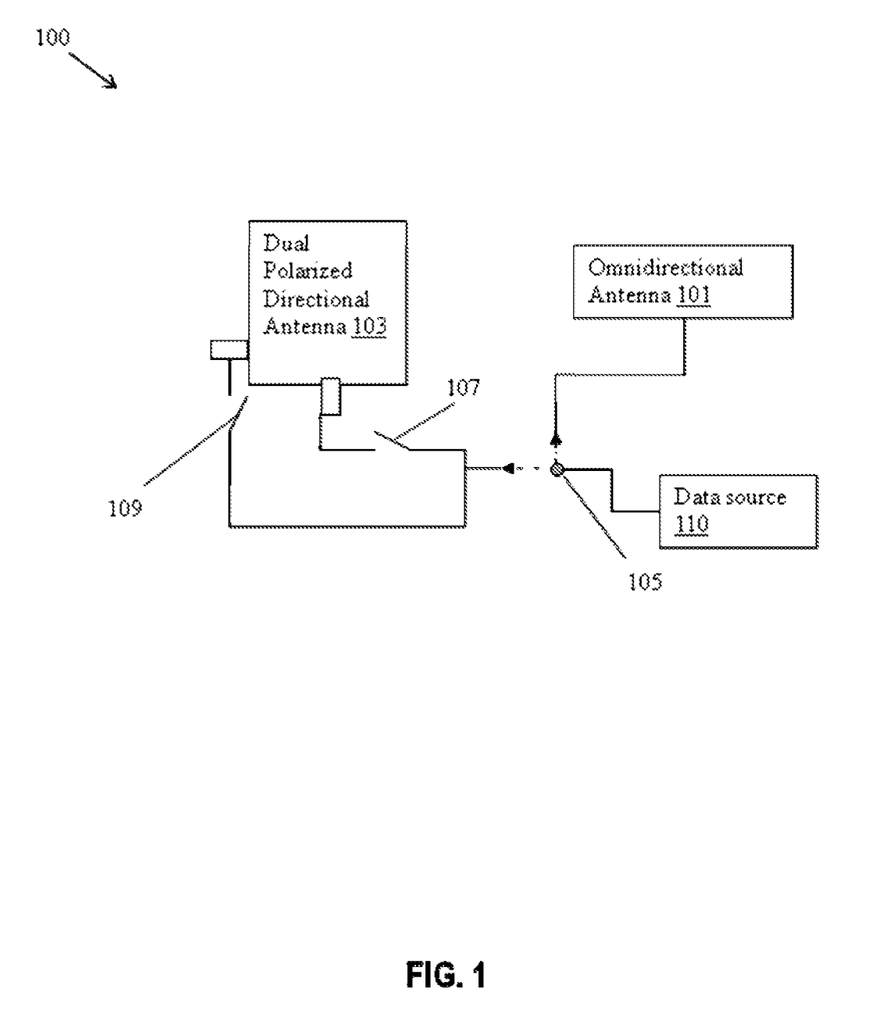
FIG. 1 shows an illustrative embodiment of antenna hardware of a node in an ad hoc network.

FIG. 1 shows an illustrative embodiment of antenna hardware of a node 100 in an ad hoc network. The node 100 includes an omnidirectional antenna 101 and a dual polarized directional antenna 103. The node 100 further includes a first switch 105 configured to switch between the omnidirectional antenna 101 and the dual polarized directional antenna 103. In some embodiments, the first switch 105 is configured to selects the omnidirectional antenna 101 by default. The first switch 105 selects the dual polarized directional antenna 103 when the node 100 wishes to establish one or two directional links with one or two other nodes in the ad hoc network.

When the node 100 wishes to receive or transmit a broadcast message, the node 100 uses the first switch 105 to access the omnidirectional antenna 101. The broadcast message is then received or transmitted by the omnidirectional antenna 101. In some embodiments, the omnidirectional antenna 101 is configured to use a default polarization (e.g., vertical polarization) to receive and transmit a broadcast message.

When the node 100 wishes to establish one or two directional links with one or two other nodes in the ad hoc network, the node 100 uses the first switch 105 to access the dual polarized directional antenna 103. The dual polarized directional antenna 103 is configured to transmit and receive directional messages between the node 100 and the other nodes. Some example information exchanged between the node 100 and the other nodes may include, without limitation, RTS, CTS, DATA, and ACK frames.

The dual polarized directional antenna 103 provides two polarizations (e.g., horizontal polarization and vertical polarization) for establishing two directional links with two other nodes in the ad hoc network. The node 100 further includes a second switch 107 and a third switch 109. The second switch 107 is closed when the node 100 uses a first polarization (e.g., vertical polarization) to establish a first directional link with another node. The third switch 109 is closed when the node 100 uses a second polarization (e.g., horizontal polarization) to establish a second directional link with yet another node. Both the second switch 107 and the third switch 109 are closed when node 100 simultaneously uses the first and the second polarizations to establish two links to two other nodes. The node 100 is capable of estimating the direction of arrival using the antenna hardware.

Figure 2A:
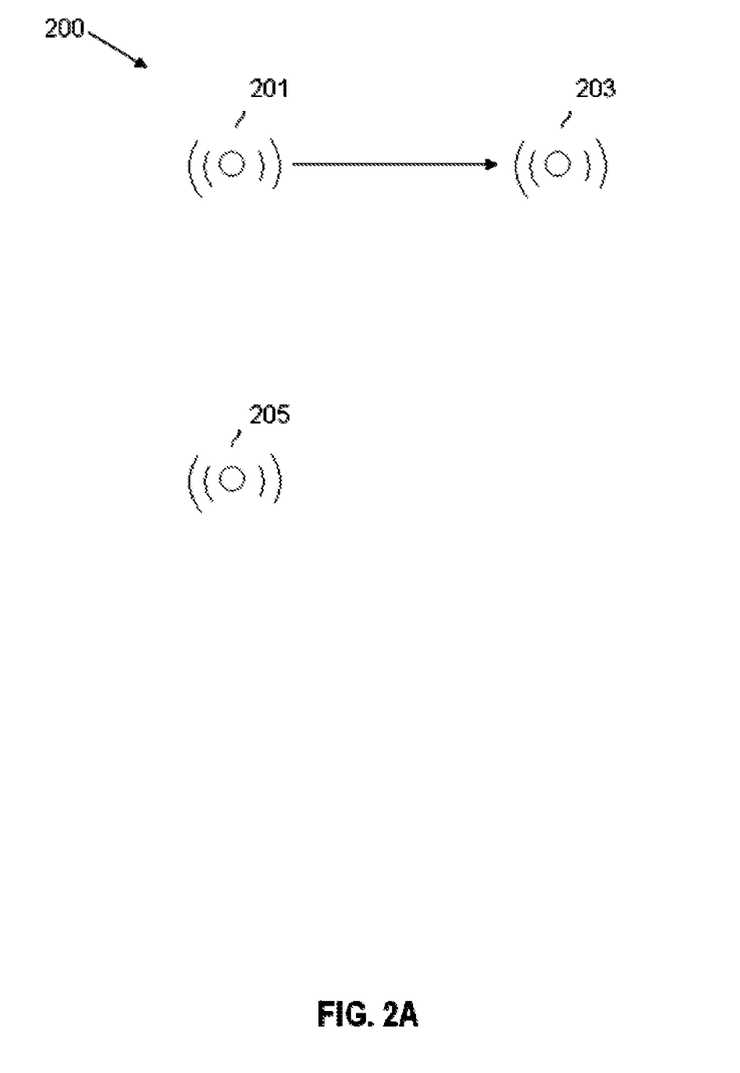
FIG. 2A shows an illustrative embodiment of an ad hoc network.

FIG. 2A shows an illustrative embodiment of an ad hoc network 200. The ad hoc network 200 includes a first node 201, a second node 203, and a third node 205. Each node includes the antenna hardware of FIG. 1. Each node broadcasts in an omnidirectional manner in one polarization, such as the vertical polarization. Two nodes establish a link in a directional manner using one polarization by default, such as the vertical polarization, and the two nodes may agree to switch the link to another polarization, such as the horizontal polarization.

Periodically an idle node that is not communicating with another node is configured to omnidirectionally broadcast its link information. The link information is piggybacked onto periodic routing updates, such as beacon or hello packets, used to create and maintain routes in the ad hoc network. The link information includes an identification code of the idle node in a first block and the same identification code of the idle node in a second block, which indicate that the node is idle. The link information may also include a desired polarization for a directional link with the node in a third block of the link information. The desired polarization may have a default value, such as the vertical polarization, which the idle node may change to avoid interference with a nearby directional link.

From the link information, one node can establish a directional link to another node. For example, assume the first node 201 and the second node 203 have established a directional link. After establishing the directional link, the first node 201 omnidirectionally broadcasts a first link information before sending a data frame to the second node 203, and the second node 203 omnidirectionally broadcasts a second link information before sending an ACK frame for the data frame to the first node 201. The first link information includes a first identification code of the first node 201 in a first block and a second identification code of the second node 203 in a second block. The first link information may also include the link polarization in a third block. When the third node 205 receives the first link information, the third node 205 knows that the first node 201 and the second node 203 are busy communicating by examining the contents in the first and the second blocks (e.g., the first and the second identification codes).

Figure 2B:
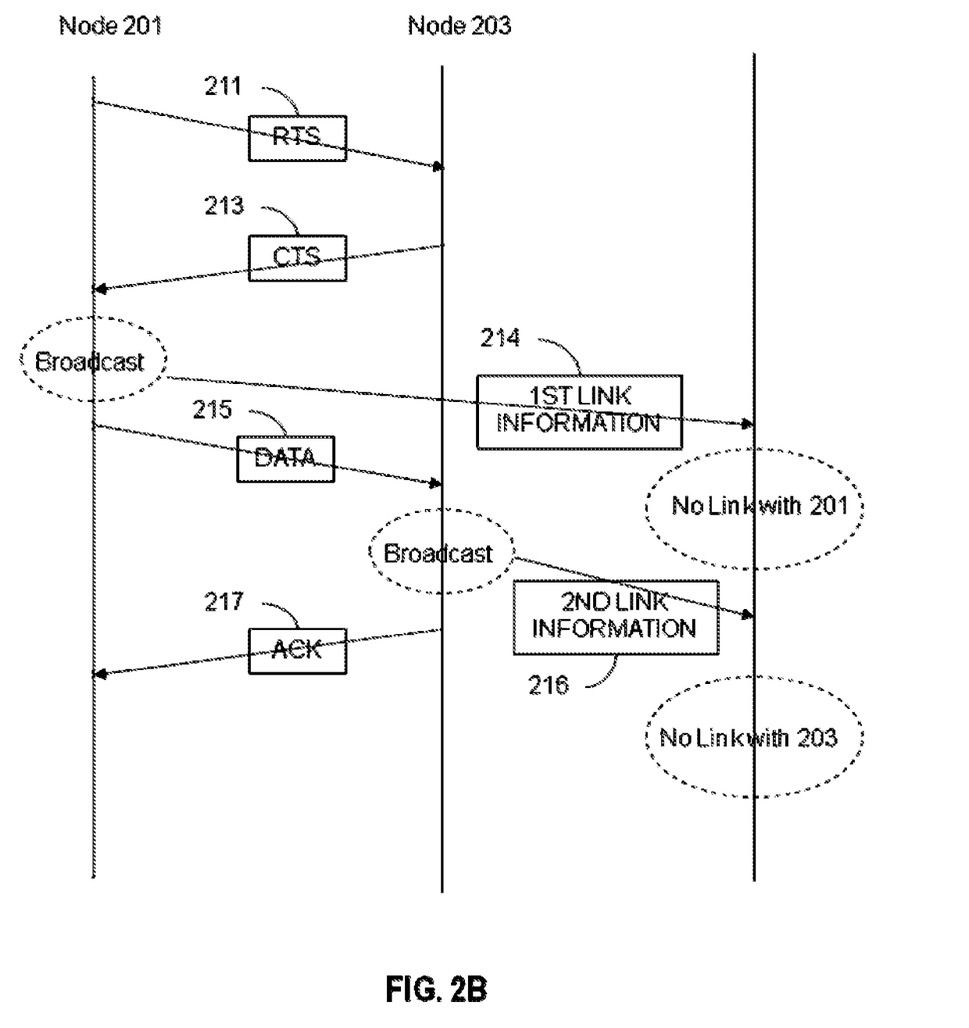
FIG. 2B shows an illustrative embodiment of interaction among nodes in the ad hoc network shown in FIG. 2A.

FIG. 2B shows an illustrative embodiment of interaction among the first node 201, the second node 203, and the third node 205 in the ad hoc network 200 shown in FIG. 2A. FIG. 2B is explained with the aid of FIG. 2A. The first node 201 uses its beamformed dual polarized directional antenna to send a RTS frame 211 to the second node 203 in the vertical polarization. In response, the second node 203 uses its own beamformed dual polarized directional antenna to send a CTS frame 213 to the first node 201 in the vertical polarization. At this point, a directional link has been established between the first node 201 and the second node 203. After the first node 201 receives the CTS frame 213 and before the first node 201 sends a DATA frame 215, the first node 201 uses its omnidirectional antenna to broadcast the first link information 214 in the vertical polarization. This is performed in the time allotted between CTS and DATA frames in the MAC mechanism of the 802.11 protocols. The first link information 214 may be received by the third node 205 or other nearby nodes. The third node 205 examines the first link information 214 and knows that the first node 201 has established a directional link with the second node 203. In view of the first link information 214, the third node 205 knows it may not establish a directional link with the first node 201 or the second node 203 using the vertical polarization. Note that the third node 205 does have the option of establishing another directional link with the first node 201 or the second node 203 using the horizontal polarization.

The first node 201 uses its beamformed dual polarized directional antenna to send the DATA frame 215 to the second node 203 in the vertical polarization. The second node 203 uses its omnidirectional antenna to broadcast the second link information 216 in the vertical polarization after the second node 203 receives the DATA frame 215 from the first node 201 and before the second node 203 sends an ACK frame 217 to the first node 201. This is performed in the time allotted between DATA and ACK frames in the MAC mechanism of the 802.11 protocols. The second node 203 then uses its beamformed dual polarized directional antenna to send the ACK frame 217 to the first node 201 in the vertical polarization. The second link information 216 may be received by the third node 205 or other nearby nodes. The above process is repeated for each additional data frame which the first node 201 wishes to send to the second node 203.

The third node 205 may examine the second link information 216 and know that the second node 203 has established a directional link with the first node 201. In view of the second link information 216, the third node 205 knows it may not establish a directional link with the first node 201 or the second node 203 using the vertical polarization.

In some embodiments, the first link information 214 and the second link information 216 may further include NAV information that indicates the durations of which the first node 201 and the second node 203 will be busy. The third node 205 may try to send a RTS frame to the first node 201 or the second node 203 after the durations to try to establish a directional link with the first node 201 or the second node 203 using the vertical polarization. The third node 205 may also try to send a RTS frame to the first node 201 or the second node 203 using the vertical polarization after the third node 205 receives updated link information indicating the first node 201 or the second node 203 is idle.

The broadcast link information may save power of the nodes in the ad hoc network 200. The nodes in the ad hoc network 200 would not send RTS frames to a node that is communicating with another node, which may save transmission power otherwise spent on the RTS frames.

Figure 3A:
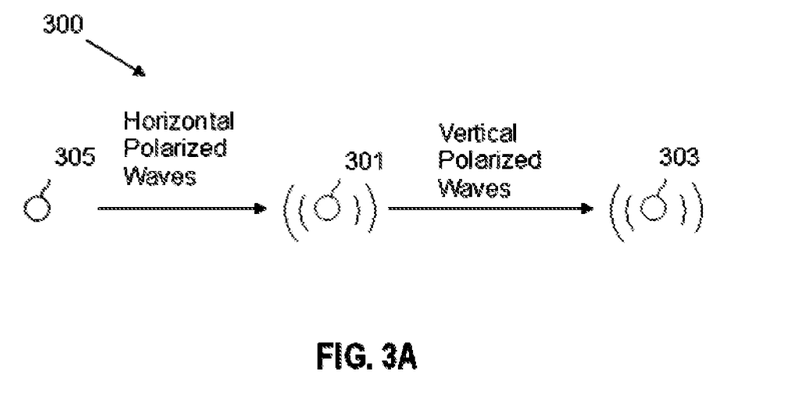
FIG. 3A shows an illustrative embodiment of an ad hoc network.

FIG. 3A shows an illustrative embodiment of an ad hoc network 300. The ad hoc network 300 includes a first node 301, a second node 303, and a third node 305. The ad hoc network 300 is similar to the ad hoc network 200. Each node broadcasts its own link information in an omnidirectional manner in one polarization, such as the vertical polarization. Two nodes establish a link in a directional manner based on the link information. In some embodiments, the link information includes eight blocks. The first four blocks (i.e., the first block to the fourth block of the link information) represent link information for a first polarization (e.g., vertical polarization). The last four blocks (i.e., the fifth block to the eighth block of the link information) represent link information for a second polarization (e.g., horizontal polarization).

The first block stores an identification code of the node and the second block stores the same identification code when a first directional link with the node is available. The third block indicates the first polarization is available for establishing the first directional link with the node. The fourth block stores NAV information for the first directional link and is zero when the first directional link is available. The fifth block stores an identification code of the node and the sixth block stores the same identification code to when a second directional link with the node is available. The seventh block indicates the second polarization is available for establishing the second directional link. The eighth block stores NAV information for the second directional link and is zero when the second directional link is available. For example, the link information may appear as (1, 1, vF, NAV; 1, 1, hF, NAV) where vF indicates the vertical polarization is free and hF indicates the horizontal polarization is free.

When a first node is communicating with a second node using the first directional link in the first polarization, the first block stores the identification code of the first node and the second block stores an identification code of the second node. The third block indicates the first polarization is not available for establishing the first link. The fourth block stores NAV information that indicates the durations of communication between the first and the second nodes using the first directional link in the first polarization. The fifth to the eighth blocks are the same as the preceding paragraph. For example, the link information may appear as (1, 2, vB, NAV; 1, 1, hF, NAV) where vB indicates the vertical polarization is busy.

When the first node is communicating with the second node in the first directional link in the first polarization and the first node is communicating with a third node in the second directional link in the second polarization, the first to the fourth blocks are the same as the preceding paragraph. The fifth block stores the identification code of the first node and the sixth block stores an identification code of the third node. The seventh block indicates the second polarization is not available for establishing the second directional link. The eighth block stores NAV information that indicates the durations of communication between the first and the third nodes using the second directional link in the second polarization. For example, the link information may appear as (1, 2, vB, NAV; 1, 3, hB, NAV) where hB indicates the horizontal polarization is busy.

Figure 3B:
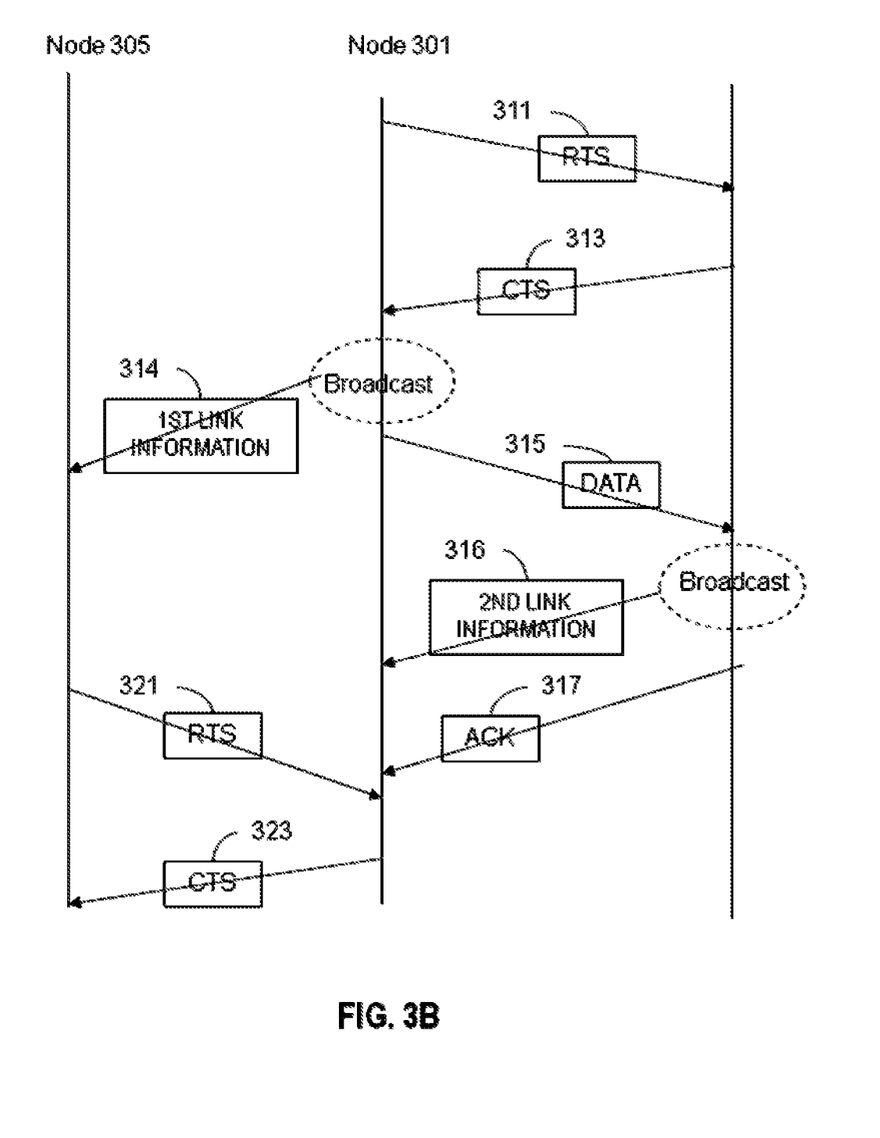
FIG. 3B shows an illustrative embodiment of interaction among nodes in the ad hoc network shown in FIG. 3A.

FIG. 3B shows an illustrative embodiment of interaction among nodes in the ad hoc network shown in FIG. 3A. FIG. 3B is explained with the aid of FIG. 3A. In FIG. 3B, the first node 301 and the second node 303 have established a directional link in the vertical polarization for communication while the third node 305 tries to establish another directional link with the first node 301 in the horizontal polarization.

To establish a directional link between the first node 301 and the second node 303, the first node 301 uses its beamformed dual polarized directional antenna to send a RTS frame 311 to the second node 303 in the vertical polarization. In response to the RTS frame 311, the second node 303 may use its beamformed dual polarized directional antenna to send a CTS frame 313 to the first node 301 in the vertical polarization.

After the first node 301 receives the CTS frame 313 and before sending a DATA frame 315, the first node 301 use its omnidirectional antenna to broadcast a first link information 314 in the vertical polarization. The first link information 314 indicates that the first node 301 has established a directional link with the second node 303 in the vertical polarization of its dual polarized directional antenna and the first node 301 is able to establish a directional link with another node in the horizontal polarization of its dual polarized directional antenna. The first link information 314 may appear as (1, 2, vB, NAV; 1, 1, hF, NAV). The first node 301 then uses its beamformed dual polarized directional antenna to send the DATA frame 315 to the second node 303 in the vertical polarization.

After the second node 303 receives the DATA frame 315 from the first node 301 and before sending an ACK frame 317 to first node 201, the second node 303 uses its omnidirectional antenna to broadcast a second link information 316 in the vertical polarization. The second link information 316 indicates the second node 303 has established a directional link with the first node 301 in the vertical polarization of its dual polarized directional antenna and the second node 303 is able to establish a directional link with another node in the horizontal polarization of its dual polarized directional antenna. The second link information 316 may appear as (2, 1, vB, NAV; 2, 2, hF, NAV). The second node 303 then uses its beamformed dual polarized directional antenna to send the ACK frame 317 to the first node 301 in the vertical polarization.

The first link information 314 may be received by the third node 305 so the third node 305 knows that the first node 301 has established a directional link with the second node 303 in the vertical polarization and the first node 301 is able to establish a directional link with another node in the horizontal polarization. When the third node 305 wishes to establish a directional link with the first node 301, the third node 305 uses its beamformed dual polarized directional antenna to send a RTS frame 321 to the first node 301 in the horizontal polarization. The RTS frame 321 informs the first node 301 that the third node 305 is ready to send data using the horizontal polarization. The first node 301 sends CTS frame to the third node 305 in the horizontal polarization using its beamformed dual polarized directional antenna. This way the first node 301 is using both the vertical and the horizontal polarizations of the dual polarized directional antenna to communicate with the second node 303 and the third node 305 simultaneously without any interference. The third node 305 receives a CTS frame 323 from the first node 301, transmits a DATA frame (not shown) to the first node 301, and receives an ACK frame (not shown) from the first node 301 all in the horizontal polarization. The third node 305 returns to its default configuration in the vertical polarization after sending the ACK frame, and the first node 301 also returns to its default configuration in the vertical polarization after receiving the ACK frame. Both first node 301 and third node 305 broadcast link information omnidirectionally as described above. Instead of the third node 305 initiating a directional link with the first node 301 as described above, the first node 301 may initiate a directional link with the third node 305.

The two different polarized waves may extend the capacity of the ad hoc network 300 without requiring additional spectrum bandwidth. The two polarizations may be used in the same spectrum bandwidth because the vertical polarized waves and the horizontal polarized waves couple poorly. The information transmitted with the vertical polarized waves and the information transmitted with the horizontal polarized waves do not interfere with each other. Therefore, a node in the ad hoc network 300 may communicate with two other nodes simultaneously. More links may be established in the ad hoc network 300 at the same time, compared to the network that utilizes a single polarized wave to exchange information, so the capacity of the ad hoc network 300 may be increased.

Since the communication between the first node 301 and the second node 303, and between the first node 301 and the third node 305 independent of each other, there is very low probability of broadcasts being transmitted simultaneously and of any interference between the broadcasts that are sent using vertical polarization of the omnidirectional antenna from neighboring nodes. Also, broadcast frames are very small and a particular broadcast from a node will stay in the network for a very small amount of time.

The broadcasts are of shorter duration as well as discreet and occur periodically. In view of the above, even if hypothetically there is interference between broadcasts from various neighboring nodes, it will not impair the network for a prolonged duration.

Figure 4A:
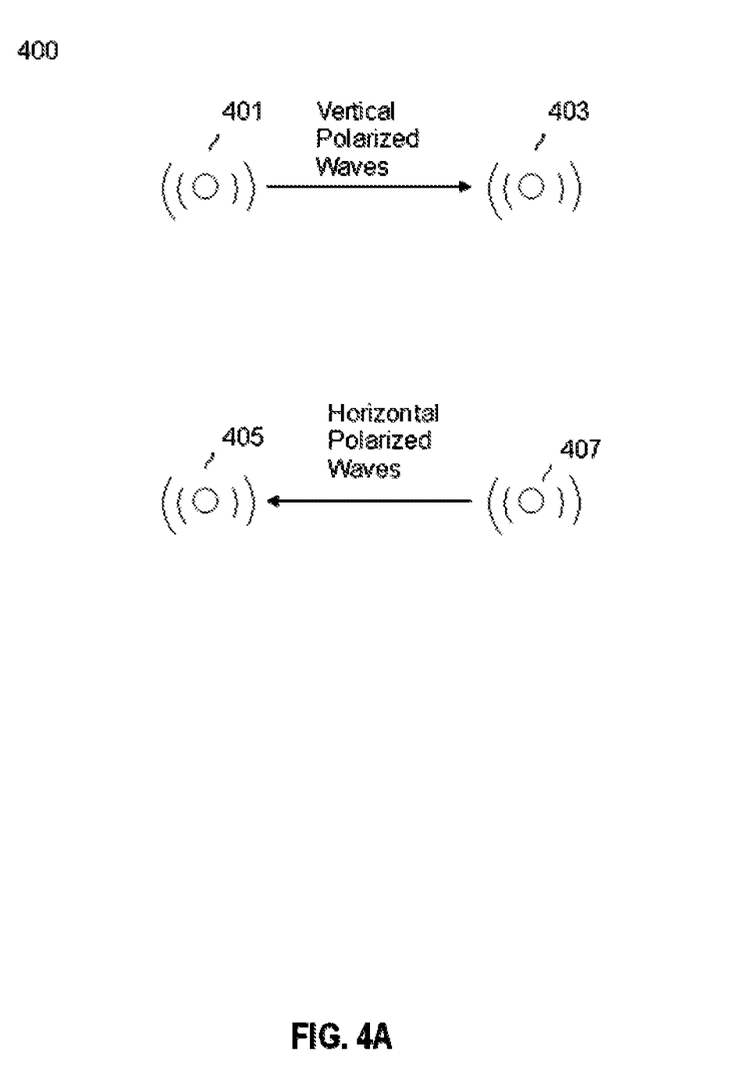
FIG. 4A shows an illustrative embodiment of an ad hoc network.

FIG. 4A shows an illustrative embodiment of an ad hoc network 400. The ad hoc network 400 may include a first node 401, a second node 403, a third node 405, and a fourth node 407. The ad hoc network 400 is similar to the ad hoc network 200. Each node broadcasts in an omnidirectional manner in one polarization, such as the vertical polarization. Two nodes establish a link in a directional manner using one polarization by default, such as the vertical polarization. Two other nodes may establish a link using another polarization, such as the horizontal polarization, to avoid interference with the directional link in the vertical polarization. Each node broadcasts its link information in the manner described above. In some embodiments, a third node establishes a directional link with a fourth node using a polarization that has not been used by other nodes close to the third node and the fourth node. The first node 401 and the second node 403 have established a directional link in the vertical polarization and omnidirectionally broadcast first and second link information, respectively. The third node 405 receives one or both of the first and the second link information. To avoid interfering with the directional link in the vertical polarization between the first node 401 and the second node 403, the third node 405 wishes to establish connection with another node (e.g., the fourth node 407) in the horizontal polarization. The third node 405 then omnidirectionally broadcasts a third link information indicating the desire to communicate in the horizontal polarization. The fourth node 407 receives the third link information. In response to the third link information, the fourth node 407 sends a request, in the horizontal polarization, to establish a directional link with the third node 405.

Figure 4B:
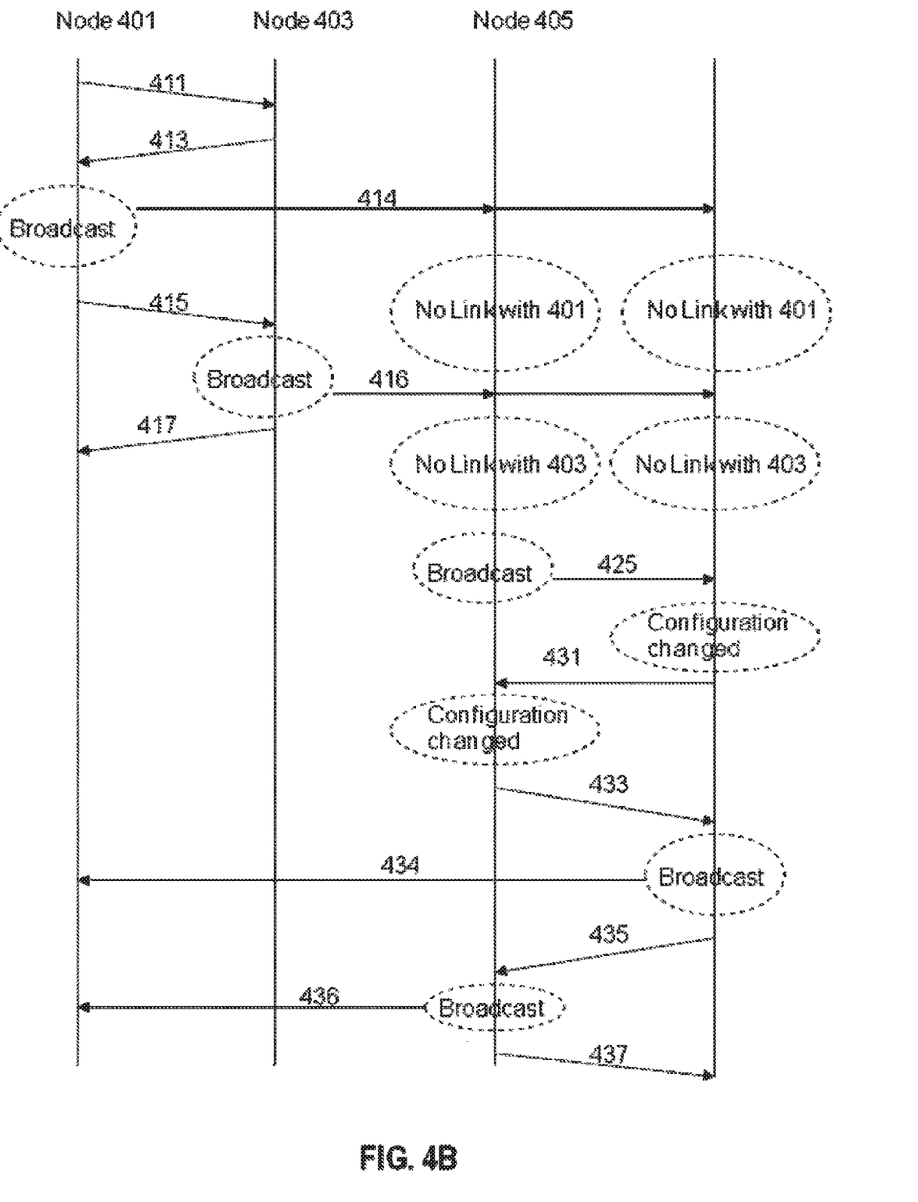
FIG. 4B shows an illustrative embodiment of interaction among nodes in the ad hoc network shown in FIG. 4A.

FIG. 4B shows an illustrative embodiment of interaction among nodes in the ad hoc network shown in FIG. 4A. FIG. 4B is explained with the aid of FIG. 4A. In some embodiments, at the beginning, all nodes are idle and use their omnidirectional antennas to broadcast their link information. Assume the first node 401 and the second node 403 first establish a directional link using the vertical polarization. As similarly described above, a RTS frame 411, a CTS frame 413, a DATA frame 415, and an ACK frame 417 may be exchanged using the vertical polarization between the first node 401 and the second node 403 with their beamformed dual polarized directional antennas.

The first node 401 and the second node 403 also use their omnidirectional antennas to broadcast a first link information 414 and a second link information 416, respectively. The first link information 414 and the second link information 416 may be received by the third node 405 and the fourth node 407. Therefore, the third node 405 and the fourth node 407 know that the first node 401 and the second node 403 are communicating in the vertical polarization. The third node 405 then uses its omnidirectional antenna to broadcast a third link information 425 using the vertical polarization. The third link information may include eight blocks. Unlike the prior link information, the first four blocks now represent link information for the horizontal polarization and the last four blocks represent link information for the vertical polarization. The placement of the link information for the horizontal polarization before the link information for the vertical polarization indicates indicate that the third node 405 prefers to communicate in the horizontal polarization. The third link information 425 may appear as (3, 3, hF, NAV; 3, 3, vF, NAV).

The third link information 425 may be received by the fourth node 407. The fourth node 407 then knows that the third node 405 wishes to set up a directional link using the horizontal polarization. The fourth node 407 then changes its default configuration and uses its beamformed dual polarized directional antenna to send a RTS frame 431 to the third node 405 using the horizontal polarization.

The RTS frame 431 informs the third node 405 that the fourth node 407 is ready to send data in the horizontal polarization. In response to the RTS frame 431, third node 405 also changes its default configuration and uses its beamformed dual polarized directional antenna to send a CTS frame 433 to the fourth node 407 in the horizontal polarization. The third node 405 and the fourth node 407 then exchange a DATA frame 435 and an ACK frame 437 in the horizontal polarization. The fourth node 407 returns to its default configuration in the vertical polarization after sending the ACK frame, and the third node 405 also returns to its default configuration in the vertical polarization after receiving the ACK frame. The fourth node 407 broadcasts a fourth link information 434 using its omnidirectional antenna after receiving the CTS frame 433 from the third node 405 and prior to sending the DATA frame 435 to the third node 405.

The fourth link information 434 indicates that the fourth node 407 has established a directional link using the horizontal polarization with the third node 405. The fourth link information 434 may appear as (4, 3, hB, NAV; 4, 4, vF, NAV). The third node 405 broadcasts a fifth link information 436 using its omnidirectional antenna after receiving the DATA frame 435 from the fourth node 407 and prior to sending the ACK frame 437 to the fourth node 407. The fifth link information 436 indicates that the third node 405 has established a directional link in the horizontal polarization with the fourth node 407. The fifth link information 436 may appear as (3, 4, hB, NAV; 3, 3, vF, NAV).

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application.

The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to disclosures containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A method for a first node to participate in an ad hoc network including the first node and at least second and third nodes, the method comprising:
   receiving a first link information broadcasted omnidirectionally by the second node, the first link information indicating if the second node is communicating via a first directional link in a first polarization with the third node;
   establishing a second directional link in a second polarization with the second node;
   in response to the second node stop being in communication via the first directional link in the first polarization with the third node and the first node wishing to communicate via the second directional link in the first polarization with the second node, establishing the second directional link in the first polarization with the second node;
   after establishing the second directional link in the first polarization with the second node and prior to sending a data via the second directional link in the first polarization to the second node, broadcasting omnidirectionally a second link information, the second link information indicating the first node is communicating via the second directional link in the first polarization with the second node; and
   after broadcasting omnidirectionally the second link information, sending the data via the second directional link in the first polarization to the second node.

2. The method of claim 1, wherein the first link information includes a first ID of the second node, a second ID of the third node, and a free or busy status of communication in the first polarization.

3. The method of claim 2, wherein establishing the second directional link in the second polarization with the second node occurs in response to the second node being in communication via the first directional link in the first polarization with the third node and the first node wishing to communicate via the second directional link in the second polarization with the second node, the second polarization being substantially orthogonal to the first polarization.

4. The method of claim 3, further comprising:
   after establishing the second directional link in the second polarization with the second node and prior to sending a data via the second directional link in the second polarization to the second node, broadcasting omnidirectionally a second link information, the second link information indicating the first node is communicating via the second directional link in the second polarization with the second node; and
   after broadcasting omnidirectionally the second link information, sending the data via the second directional link in the second polarization to the second node.

5. The method of claim 1, wherein the first link information includes a network allocation vector indicating a duration of communication between the second node and the third node via the first directional link in the first polarization, the method further comprising:
   waiting for the duration to elapse and then attempting to establish the second directional link in the first polarization with the second node.

6. The method of claim 1, wherein the second link information includes a first ID of the first node, a second ID of the second node, and a busy status of the second directional link in the first polarization.

7. The method of claim 1, further comprising:
   in response to the second node being in communication via the first directional link using the first polarization with the third node and the first node wishing to communicate with the third node via a third link in the second polarization, broadcasting omnidirectionally a third link information, the third link information indicating the first node wishes to communicate with the third node via the third link in the second polarization.

8. The method of claim 1, further comprising:
in response to the second node being in communication via the first directional link in the first polarization with the third node and the first node wishes to communicate with a fourth node in the ad hoc network, receiving a third link information broadcasted omnidirectionally by the fourth node, the third link information identifying the fourth node wishes to communicate via a third link in the second polarization;
establishing the third directional link in the second polarization with the fourth node;
after establishing the third directional link in the second polarization with the fourth node and before sending an other data via the third directional link in the second polarization to the fourth node, broadcasting omnidirectionally a fourth link information, the fourth link information indicating the first node is communicating via the third directional link in the second polarization with the fourth node; and
after broadcasting omnidirectionally the fourth link information, sending the other data via the third directional link in the second polarization to the fourth node.

9. The method of claim 1, wherein establishing the second directional link in the first polarization with the second node comprises exchanging request-to-send and clear-to-send frames with the second node.

10. The method of claim 1, wherein:
each link information includes:
a first part;
a second part;
in response to a node broadcasting the link information but not being or stop being in communication with an other node in the first or the second polarization, the first part and the second part including an ID of the node; and
in response to the node broadcasting the link information and being in communication with the other node in the first or the second polarization, the first part including the ID of the node, and the second part including an ID of the other node.

11. The method of claim 10, wherein:
the first part further includes a free or busy status of communication in the first polarization;
the second part further includes a free or busy status of communication in the second polarization; and
the first polarization in the first part is the preferred polarization for communication.

12. A method for a first node to participate in an ad hoc network including the first node and at least a second node, the method comprising:
the first node broadcasting omnidirectionally a first link information, the first link information indicating the first node is communicating via a first directional link in a first polarization with the second node;
after receiving a data via the first directional link in the first polarization from the second node and prior to sending an acknowledgment via the first directional link in the first polarization to the second node, the first node broadcasting omnidirectionally an updated first link information, the updated first link information indicating the first node is communicating via the first directional link in the first polarization with the second node and is able to establish a second directional link with a third node in a second polarization while the first node is communicating with the second node;
after broadcasting omnidirectionally the updated first link information, the first node sending the acknowledgement via the first directional link in the first polarization to the second node;
in response to the first node stop being in communication via the first directional link in the first polarization with the second node and the third node wishing to communicate via the first directional link in the first polarization with the first node, establishing a second directional link in the first polarization with the third node;
after establishing the second directional link in the first polarization with the third node and prior to sending a data via the second directional link in the first polarization to the third node, broadcasting omnidirectionally a second link information, the second link information indicating the first node is communicating via the second directional link in the first polarization with the third node; and
after broadcasting omnidirectionally the second link information, sending the data via the second directional link in the first polarization to the third node.

13. The method of claim 12, wherein the updated first link information includes a network allocation vector indicating a duration of communication between the first node and the second node via the first directional link in the first polarization.

14. The method of claim 12, wherein the updated first link information identifies the first polarization of the first directional link.

15. The method of claim 12, further comprising:
in response to the first node being in communication via the first directional link in the first polarization with the second node and the third node wishing to communicate via the second directional link in the second polarization with the first node, the second polarization being orthogonal to the first polarization, the first node:
establishing the second directional link in the second polarization with the third node;
after establishing the second directional link in the second polarization with the third node and before sending an other data via the second directional link in the second polarization to the third node, broadcasting omnidirectionally a third link information, the third link information indicating the first node is communicating via the second directional link in the second polarization with the third node; and
after broadcasting omnidirectionally the third link information, sending the other data via the second directional link in the second polarization to the third node.

16. The method of claim 12, further comprising:
in response to the first node being in communication via the first directional link in the first polarization with the second node and the third node wishing to communicate via the second directional link in the second polarization with the first node, the second polarization being orthogonal to the first polarization, the first node:
establishing the second directional link in the second polarization with the third node;
receiving an other data via the second directional link in the second polarization from the third node;
after receiving the other data via the second directional link in the second polarization from the third node and prior to sending another acknowledgment for the other data via the second directional link in the second polarization to the third node, broadcasting omnidirectionally a third link information, the third link information indicating the first node is communicating via the first directional link in the first polarization with the second node and the first node is communicating via the second directional link in the second polarization with the third node; and after broadcasting omnidirectionally the third link information, sending the other acknowledgement for the other data via the second directional link in the second polarization to the third node.

17. The method of claim 12, wherein:

each link information includes:

a first part;

a second part;

in response to a node broadcasting the link information but not being or stop being in communication with an other node in the first or the second polarization, the first part and the second part including an ID of the node; and in response to the node broadcasting the link information and being in communication with the other node in the first or the second polarization, the first part including the ID of the node, and the second part including an ID of the other node.

18. The method of claim 17, wherein:

the first part further includes a free or busy status of communication in the first polarization;

the second part further includes a free or busy status of communication in the second polarization; and the first polarization in the first part is the preferred polarization for communication.

\* \* \* \* \*